United States Patent
Seto et al.

(10) Patent No.: US 7,231,115 B2
(45) Date of Patent: Jun. 12, 2007

(54) OPTICAL COLLIMATOR-USE LENS COMPONENT, OPTICAL COLLIMATOR, AND METHOD OF ASSEMBLING THESE

(75) Inventors: Tadashi Seto, Otsu (JP); Masaaki Kadomi, Otsu (JP); Hirokazu Tanaka, Otsu (JP); Hirokazu Takeuchi, Otsu (JP); Shintaro Ito, Otsu (JP)

(73) Assignee: Nippon Electric Glass Co. Ltd., Shiga (JP)

( * ) Notice: Subject to any disclaimer, the term of this patent is extended or adjusted under 35 U.S.C. 154(b) by 51 days.

(21) Appl. No.: 10/503,739

(22) PCT Filed: Feb. 21, 2003

(86) PCT No.: PCT/JP03/01912

§ 371 (c)(1),
(2), (4) Date: Jan. 10, 2005

(87) PCT Pub. No.: WO03/075059

PCT Pub. Date: Sep. 12, 2003

(65) Prior Publication Data

US 2005/0123240 A1    Jun. 9, 2005

(30) Foreign Application Priority Data

Feb. 22, 2002  (JP)  ............................. 2002-047182
Feb. 22, 2002  (JP)  ............................. 2002-047187

(51) Int. Cl.
    *G02B 6/32*     (2006.01)
(52) U.S. Cl. .............................. 385/33; 385/35; 385/79
(58) Field of Classification Search .................. None
    See application file for complete search history.

(56) References Cited

U.S. PATENT DOCUMENTS 4,378,954 A * 4/1983 Baker ........................... 385/80

(Continued)

FOREIGN PATENT DOCUMENTS

JP           60-162209 A  *  8/1985

(Continued)

*Primary Examiner*—Rodney Bovernick
*Assistant Examiner*—Mike Stahl
(74) *Attorney, Agent, or Firm*—J.C. Patents

(57) ABSTRACT

Disclosed is an optical collimator-use lens component including: a thin tube; a partially spherical lens that has been fixed in an inner hole of the thin tube so that an insertion portion having a predetermined length is left, is made of glass whose refractive index is approximately uniform, and has translucent spherical surfaces, whose centers of curvature are approximately the same, at both ends of a cylindrical portion of the partially spherical lens; and an adhesive that bonds the partially spherical lens to the thin tube. An axial deviation amount between a center axis of the thin tube and an optical axis of the partially spherical lens is 5 μm or less. When a capillary tube, in whose inner hole an optical fiber has been fixed and whose axial deviation amount between an outer peripheral surface of the capillary tube and a core center of an end surface of the optical fiber is 1.5 μm or less, is inserted into the insertion portion of the thin tube and the end surface of the optical fiber is fixed at a position at which a distance of the end surface to a focal point position of the partially spherical lens becomes ±40 μm or less, emission light has an emission light bend of 0.2° or less with respect to the center axis of the thin tube.

19 Claims, 13 Drawing Sheets

U.S. PATENT DOCUMENTS

| | | | |
|---|---|---|---|
| 4,725,115 A | * 2/1988 | Beasley | 385/35 |
| 4,731,347 A | * 3/1988 | Stetson | 501/21 |
| 4,824,200 A | * 4/1989 | Isono et al. | 385/24 |
| 4,832,440 A | * 5/1989 | Anderton | 385/70 |
| 5,721,802 A | * 2/1998 | Francis et al. | 385/137 |
| 5,745,626 A | * 4/1998 | Duck et al. | 385/96 |

FOREIGN PATENT DOCUMENTS

| | | | |
|---|---|---|---|
| JP | 62-293210 A | * 12/1987 | 385/35 |
| JP | 4-246617 A | * 9/1992 | |
| JP | 8-254639 A | * 10/1996 | |

* cited by examiner

INCLINATION OF EMISSION LIGHT L = EMISSION LIGHT BEND θ

DISTRIBUTION OF INTENSITY OF OPTICAL SIGNAL BEAM

DISTRIBUTION OF INTENSITY OF OPTICAL SIGNAL BEAM $f = n3 \cdot R / (2 \cdot (n3 - n1))$ $w = f \cdot \tan \beta$

AXIAL DEVIATION LOSS

OPTICAL COLLIMATOR-USE LENS COMPONENT, OPTICAL COLLIMATOR, AND METHOD OF ASSEMBLING THESE

BACKGROUND OF THE INVENTION

The present invention relates to an optical collimator-use lens component, an optical collimator, a method of assembling the optical collimator-use lens component, and a method of assembling the optical collimator, with which an optical fiber for optical communications and a lens are optically coupled to each other and emission light from the optical fiber is converted into parallel light or parallel light is condensed by the lens and is brought into incident on the optical fiber.

When a high-speed and large-capacity optical fiber communications system is structured, many optical devices are used. The optical devices include: an optical device that extracts an optical signal having an arbitrary wavelength from among multiple optical signals whose wavelengths have been multiplexed; and an optical device that uses an optical crystal for matching phases of optical signals, and many optical collimators are used therein which each convert a widening optical signal emitted from an optical fiber into parallel light.

With a conventional optical collimator production method, as shown in FIG. 14, a capillary tube 3 with an optical fiber 2 is first fixed to a thin tube 1, helium-neon laser light L generated by a visible range light source is caused to be emitted from the optical fiber 2, a lens 5 held on a precision stage 4 is aligned so as to have an optically appropriate positional relation while the collimated state of the laser light L is observed using a projection stage 6, and then the lens 5 is fastened to the thin tube 1 using an epoxy-based adhesive 7.

With the conventional assembling method described above, at the time of assembling, the laser light L is actually caused to be emitted from the optical fiber 2, so that it is required to connect the light source and the optical fiber 2 with high precision at a several μm level. The requirement leads to a problem in that preparation for production of the optical collimator, such as work concerning the alignment and processing of the optical fiber 2, takes much time and labor and workability is extremely low.

Also, with the conventional assembling method, the actual holding margin of the lens 5 is less than several mm and the alignment of the optical position requires high precision at several μm or several tenths of μm level, so that there is a problem in that the workability is further lowered.

Further, at the time of the optical position alignment, a gap exists between the lens 5 and the thin tube 1, so that there occurs a problem in that when the adhesive 7 is cured for the fastening after the positioning, the positions of the lens 5 and the like tend to be displaced due to volumetric shrinkage of the adhesive 7.

SUMMARY OF THE INVENTION

The present invention has an object to provide an optical collimator-use lens component, an optical collimator-use lens component assembling method, an optical collimator, and an optical collimator assembling method, with which the necessity of the conventional optical collimator assembling method to pass light through an optical fiber at the time of assembling is eliminated, the assembling is facilitated, and reliability concerning optical alignment is increased.

In order to attain the object described above, according to the present invention, there is provided an optical collimator-use lens component including: a thin tube; a partially spherical lens that has been fixed in an inner hole of the thin tube so that an insertion portion having a predetermined length is left, is made of glass whose refractive index is approximately uniform, and has translucent spherical surfaces, whose centers of curvature are approximately the same, at both ends of a cylindrical portion of the partially spherical lens; and an adhesive that bonds the partially spherical lens to the thin tube, in which an axial deviation amount between a center axis of the thin tube and an optical axis of the partially spherical lens is 5 μm or less, and when a capillary tube, in whose inner hole an optical fiber has been fixed and whose axial deviation amount between an outer peripheral surface of the capillary tube and a core center of an end surface of the optical fiber is 1.5 μm or less, is inserted into the insertion portion of the thin tube and the end surface of the optical fiber is fixed at a position at which a distance of the end surface to a focal point position of the partially spherical lens becomes ±40 μm or less, emission light has an emission light bend of 0.2° or less with respect to the center axis of the thin tube. According to the present invention, merely by inserting the capillary tube, in whose inner hole the optical fiber has been fixed, into the insertion portion of the thin tube and fixing the capillary tube at a position at which a predetermined distance is obtained, it becomes possible to extremely easily produce an optical collimator, with which emission light has an emission light bend at a level that has conventionally been impossible to realize.

When the axial deviation amount between the center axis of a thin tube constituting an optical collimator-use lens component and the optical axis of a partially spherical lens is 5 μm or less, as shown in FIG. 1(A), it is possible to obtain a desired emission light bend θ of emission light L that is 0.2° or less with respect to the center axis of the thin tube. On the other hand, when the axial deviation amount between the center axis of the thin tube and the optical axis of the partially spherical lens exceeds 5 μm, as shown in FIG. 1(B), it becomes impossible to obtain the desired emission light bend 9 of the emission light L that is 0.2° or less with respect to the center axis of the thin tube.

It is important that the axial deviation amount between the outer peripheral surface of a capillary tube, in whose inner hole the optical fiber 15 has been fixed, and the core center of an end surface of the optical fiber 15 be 1.5 μm or less. When this axial deviation amount exceeds 1.5 μm, as shown in FIG. 1(B), it becomes impossible to realize the desired emission light bend θ of the emission light that is 0.2° or less with respect to the center axis of the thin tube. In this case, the distribution of beam intensity of the emission light L is decentered and it becomes impossible to obtain a desired coupling efficiency of an optical signal.

Also, when a deviation occurs in coaxiality among a thin tube inner surface, the optical axis of the partially spherical lens, and the optical axis of the optical fiber in the capillary tube, as shown in FIG. 1(B), an angle occurs in obtained parallel light. Although an allowable axial deviation amount is determined within an allowable angle range in accordance with an application purpose, if this angle becomes too large, attenuation of a light quantity occurs when the parallel light is further returned to an optical fiber by means of another optical collimator. For instance, in the case of an optical collimator that uses a partially spherical lens made of LaSF015, which is a glass material whose refractive index is around 1.8, and having a radius of curvature of 1.75 mm, in order to achieve an insertion loss (which is a general coupling characteristic) of 0.2 dB or less, it is required to suppress the angle described above to around 0.1° or less. Also, in this case, an allowable axial deviation between the optical axis of the partially spherical lens and the optical axis of the optical fiber 15 becomes around 4 μm.

As to the thin tube used in the present invention, it is important that the inner surface of the thin tube and the optical axis of the partially spherical lens be arranged coaxially and the thin tube inner surface and the capillary tube with the optical fiber have appropriate fitting dimensions so that when the capillary tube with the optical fiber is inserted into the thin tube inner surface, alignment is automatically performed. When an excessive deviation occurs in the coaxiality among the thin tube inner surface, the optical axis of the partially spherical lens, and the optical fiber in the capillary tube, an angle occurs in obtained parallel light. Therefore, the allowable axial deviation amount of each element is determined by the allowable range of the angle in accordance with an application purpose. Note that when the capillary tube with the optical fiber and the thin tube are fixed through welding, it is preferable that stainless steel that is superior in weldability and weatherability be used.

Also, as shown in FIG. 2, when an optical signal is given and received by arranging one pair of the optical collimators so as to oppose each other, if the end surface of the optical fiber is arranged at a focal point position FP of the partially spherical lens, a beam waist BW of the emission light is formed at a position shown in FIG. 2(B). When the end surface of the optical fiber is arranged at a position displaced frontward from the focal point position FP of the partially spherical lens, the beam waist BW of the emission light is formed at a position shown in FIG. 2(C) (position close to the partially spherical lens). In this case, when the end surface of the optical fiber is arranged at a position displaced frontward by 40 μm or more from the focal point position FP of the partially spherical lens, the beam waist BW is not formed and the emission light widens. On the other hand, when the end surface of the optical fiber is arranged at a position displaced backward from the focal point position FP of the partially spherical lens, the beam waist BW of the emission light is formed at a position shown in FIG. 2(D) (position away from the partially spherical lens). In this case, when the end surface of the optical fiber is arranged at a position displaced backward by 40 μm or more from the focal point position FP of the partially spherical lens, the beam waist BW is not formed and the emission light widens. Accordingly, it is important that the end surface of the optical fiber be fixed at a position at which its distance from the focal point position of the partially spherical lens is ±40 μm or less.

Any partially spherical lens is usable as the partially spherical lens used in the present invention so long as it is made of optical glass or the like, whose refractive index is approximately uniform, and has been formed using a material with which it is possible to produce a partially spherical lens having high focal point accuracy through working into a perfectly spherical shape; a partially spherical lens produced by grinding a periphery of a sphere lens having high sphericity is suited from the viewpoint of reduction in size and diameter of the optical collimator. Note that the optical axis of the partially spherical lens becomes an axis that passes through the center of curvature of the lens and is parallel to the center axis of the thin tube, so that no influence is exerted by aside surface shape, inclination of a working axis, an axial deviation, and the like at the time of grinding of the periphery. Also, it is preferable that optical glass, such as BK7, K3, TaF3, LaF01, or LaSF015, be used to produce the partially spherical lens.

The partially spherical lens is a lens that originally has spherical aberration and when its refractive index is low, the spherical aberration becomes large and the partially spherical lens lowers the coupling efficiency of an optical signal emitted from an optical fiber end surface or an optical signal condensed on an optical fiber end surface. Accordingly, it is preferable that the partially spherical lens used in the present invention be 1.7 or more in refractive index. With this construction, it becomes possible to produce easily an optical collimator, with which it is possible to obtain parallel light having high connection efficiency and an emission light bend.

In the construction described above, it is preferable that the distance between the end surface of the optical fiber and the translucent spherical surface of the partially spherical lens, that is, a distance where the radius of curvature R of the translucent spherical surface is subtracted from the focal distance f of the partially spherical lens be 0.1 mm or more, more preferably 0.15 mm or more. With this construction, it becomes possible to significantly reduce light that is reflected from the translucent spherical surface of the partially spherical lens and is incident on the optical fiber. As a result, variations of optical signal characteristics are suppressed within a working distance and it becomes possible to structure a high-speed and large-capacity optical communications system with the partially spherical lens.

When the radius of curvature R of the partially spherical lens is small, for instance, if the distance between the end surface 15a of the optical fiber 15 and the translucent spherical surface of the partially spherical lens 12 is less than 0.1 mm, as shown in FIG. 3, a large quantity of reflection light Lb from the translucent spherical surface returns to the end surface 15a of the optical fiber 15 and becomes noise. On the other hand, when the distance becomes longer than "focal point position+40 μm", no beam waist BW is formed and the light widens. Therefore, it is important that the distance between the end surface of the optical fiber and the translucent spherical surface of the partially spherical lens be 0.1 mm or more. Also, in order to further reduce the reflection light that is incident again on the optical fiber end surface, the distance is preferably 0.15 mm or more.

In the construction described above, in order to make it possible to observe the distance between the end surface of the optical fiber and the translucent spherical surface of the partially spherical lens from the outside, a through portion may be provided at a predetermined position of the thin tube.

In order to make it possible to observe the distance between the end surface of the optical fiber and the translucent spherical surface of the partially spherical lens from the outside, a metal-made sleeve provided with an observation window as the through portion at the predetermined position may be used, for instance. In order to obtain parallel light, it is required to arrange the optical fiber end surface at the focal point position of the partially spherical lens. In the present invention, such a thin tube having a through portion is used, so that it is possible to adjust the distance between the vertex of the translucent spherical surface of the partially spherical lens and the optical fiber end surface with ease by measuring the distance using a measuring machine such as a laser light length measuring machine or a microscope. Also, after the adjustment of the distance described above is performed, the capillary tube with the optical fiber is fixed in the thin tube using an adhesive or through welding. When doing so, it is possible to observe a gap portion between the end surface of the optical fiber and the translucent spherical surface of the partially spherical lens, so that this construction is also suited for confirmation of whether any problems occur in a light passing region.

Alternatively, in the construction described above, the thin tube may be formed using a transparent body with which measurement of the distance between the end surface of the optical fiber and the translucent spherical surface of the partially spherical lens is possible from the outside. With this construction, it becomes possible to produce the same effect as above.

For instance, it is possible to use as the thin tube a transparent glass tube that transmits light or magnetism for the measurement of the distance described above. As to the material of the thin tube, when the thin tube is used as a tube, borosilicate glass or the like is suited which has favorable thermal workability, transmits light and magnetism, and is superior in weatherability.

In the construction described above, the thin tube may be formed using glass or crystallized glass. With this construction, it becomes possible to use a thin tube that is high in accuracy and is low in cost. As a result, it becomes possible to reduce the structuring cost of a high-speed and large-capacity optical communications system.

Any glass-made or crystallized-glass-made thin tube is usable so long as it has a coefficient of thermal expansion that is close to those of the partially spherical lens and the capillary tube. When the thin tube is made of a material with which it is possible to control the state of crystal precipitation, it becomes possible to obtain the thin tube with high accuracy and at low cost using a continuous molding method.

In the construction described above, the thin tube may be a split sleeve.

As to the inner diameter size of the split sleeve, it is important that fitting with the capillary tube with the optical fiber have a tight fit relation. A difference in size between them exerts an influence on a deviation between the inner surface of the thin tube and the optical axis of the partially spherical lens. When the split sleeve has an inner diameter that is smaller than the capillary tube with the optical fiber by several μm, it becomes possible to eliminate the size difference, so that this construction is effective. It is possible to use as the split sleeve a split sleeve made of a metal, zirconia ceramics, or the like.

When the split sleeve is made of a metal, it is preferable that a metallic material be used which is low in hardness because it becomes possible to prevent damage to the surfaces of the partially spherical lens and the capillary tube with the optical fiber and to prevent dusting. Phosphor bronze, stainless steel, or the like that is high in dimensional reproducibility is suited as such a metallic material.

In the construction described above, an epoxy-based resin or a low melting point glass frit may be used as the adhesive, which has been mixed with a filler made of at least one material selected from the group consisting of ceramics, glass, and metals.

In the case of an epoxy adhesive that is generally used to assemble a collimator, volumetric shrinkage of around 20% occurs at the time of curing. In order to prevent a positional displacement of the partially spherical lens due to such shrinkage, it is effective that the adhesive be mixed with a filler made of at least one material selected from the group consisting of ceramics, glass, and metals. Also, when the adhesive is mixed with the filler, a thixotropic property is imparted to the adhesive, so that this construction is also effective at preventing liquid dropping and improving the strength of the adhesive.

Also, the following construction may be adopted. An inner thin tube having an inner hole with a predetermined inner diameter is inserted into and arranged in the insertion portion of the thin tube. The inner tube is bonded to and fixed in the insertion portion under a state where an end surface of the inner thin tube that is at right angles to the tube axis of the inner thin tube with predetermined accuracy is abutted against the translucent spherical surface of the partially spherical lens. With this construction, it becomes possible to fasten the partially spherical lens and the inner thin tube at precise posit positions with respect to the thin tube so as to have a precise coaxial relation. As a result, it becomes possible to produce an optical collimator that is superior in optical characteristics.

It is preferable that the inner thin tube used in the present invention have an outer diameter with which fitting into the insertion portion of the thin tube has a clearance fit relation with a clearance of several μm or less or a tight fit relation, have an inner diameter that is larger than the capillary tube by several μm so that emission/incident light from/onto the optical fiber will never be intercepted, and include an end surface that is at right angles to the tube axis of the inner thin tube with predetermined accuracy at a level of from several □ to several □.

In the construction described above, the thin tube and/or the inner thin tube may be formed using transparent glass that transmits 50% or more of light, whose wavelength is 350 to 500 nm, with a thickness of 1 mm. With this construction, it becomes possible to fasten the optical fiber or the capillary tube with the optical fiber in the inner thin tube in a short time using a light curing adhesive. As a result, it becomes possible to produce the optical collimator with efficiency.

Here, the transmission of 50% or more of light, whose wavelength is 350 to 500 nm, with the thickness of 1 mm means that light in the range of from near ultraviolet rays to blue visible rays, against which the light curing adhesive exhibits high curing reaction sensitivity, is sufficiently transmitted. It is possible to use as the transparent glass borosilicate glass, quartz glass, or the like where the impurity content of iron or the like that lowers transparency has been suppressed.

Also, in order to attain the object described above, the present invention provides a method of assembling an optical collimator-use lens component including: a thin tube; a partially spherical lens that has been fixed in an inner hole of the thin tube so that an insertion portion having a predetermined length is left, is made of glass whose refractive index is approximately uniform, and has translucent spherical surfaces, whose centers of curvature are approximately the same, at both ends of its cylindrical portion; and an adhesive that bonds the partially spherical lens to the thin tube, the optical collimator-use lens component assembling method including: inserting an inner thin tube having an inner hole with a predetermined inner diameter into the inner hole of the thin tube; fixing the inner thin tube under a state where an end surface of the inner thin tube that is at right angles to a tube axis of the inner thin tube with predetermined accuracy exists at a predetermined position; positioning the partially spherical lens by inserting the partially spherical lens into the inner hole of the thin tube so as to be abutted against the end surface of the inner thin tube; and bonding and fixing the partially spherical lens in the thin tube. With this method according to the present invention, it becomes possible to perform the positioning of the partially spherical lens with respect to the inner hole of the thin tube with accuracy. As a result, it becomes possible to produce the optical collimator-use lens component with efficiency.

With the assembling method according to the present invention, in order to perform the positioning of the partially spherical lens with accuracy, it is important that the inserted inner thin tube have the thin tube has a clearance fit relation with a clearance of several µm or less or a tight fit relation, and the end surface of the inner thin tube that is at right angles to the tube axis of the inner thin tube with predetermined accuracy be positioned at a predetermined position. Note that the thin tube is given an extra length with which when the capillary tube with the optical fiber is arranged so that its distance to the partially spherical lens becomes appropriate, it is possible to hold the capillary tube with sufficient strength. Also, when a positional displacement at the time of curing of the adhesive causes no optical problem, an adhesive not mixed with a filler may be used.

In the construction described above, before or after the partially spherical lens is bonded and fixed in the thin tube, the inner thin tube may be removed from the inside of the thin tube. With this construction, it becomes possible to achieve highly accurate coaxiality between the thin tube inner hole and the partially spherical lens with ease. As a result, it becomes possible to produce an optical collimator-use lens component, which is superior in optical characteristics, with high reproducibility as well as with ease.

For instance, it is possible to realize highly accurate coaxiality between the thin tube inner hole and the center of curvature (that is, the optical axis) of the partially spherical lens with ease by: adsorbing the partially spherical lens to the inner thin tube having an outer diameter, which is the same as that of the capillary tube with the optical fiber, and a hole that is coaxial with the outer diameter; inserting the partially spherical lens into the thin tube; fastening the partially spherical lens by filling a gap between the partially spherical lens and the thin tube with an adhesive and curing the adhesive; and then stopping the adsorption and pulling out the inner thin tube.

In the optical collimator-use lens component according to the present invention, the thin tube inner surface and the optical axis of the partially spherical lens are arranged coaxially and the thin tube inner surface and the capillary tube with the optical fiber are set at appropriate fitting dimensions so that alignment is performed automatically when the capillary tube with the optical fiber is inserted into the thin tube inner surface. Here, if a deviation occurs in the coaxiality among the thin tube inner surface, the optical axis of the partially spherical lens, and the optical fiber in the capillary tube, an angle occurs in obtained parallel light. Therefore, an allowable axial deviation amount is determined within an allowable range of the angle in accordance with an application purpose. Also, aside from this construction, the same effect may be produced using a spacer, which adjusts the distance between the vertex of the partially spherical lens and the optical fiber end surface, or a protrusion-like stopper provided on the thin tube inner surface.

Further, in order to attain the object described above, according to the present invention, there is provided an optical collimator including a lens component and a capillary tube into whose inner hole an optical fiber has been fixed, in which the lens component includes: a thin tube; a partially spherical lens that has been fixed in an inner hole of the thin tube so that an insertion portion having a predetermined length is left, is made of glass whose refractive index is approximately uniform, and has translucent spherical surfaces, whose centers of curvature are approximately the same, at both ends of a cylindrical portion of the partially spherical lens; and an adhesive that bonds the partially spherical lens to the thin tube, an axial deviation amount between a center axis of the thin tube and an optical axis of the partially spherical lens being 5 µm or less, an axial deviation amount between an outer peripheral surface of the capillary tube and a core center of an end surface of the optical fiber is 1.5 µm or less, and the capillary tube is inserted into the insertion portion of the thin tube of the lens component and is fixed at a position at which a distance of the end surface of the optical fiber to a focal point position of the partially spherical lens becomes ±40 µm or less.

As to each construction element of the optical collimator described above, every point already described in connection with the optical collimator-use lens component applies, so that the following description will be simplified by omitting repetitive description.

Also, in the optical collimator according to the present invention, for the same reason as that already described in connection with the optical collimator-use lens component, it is possible to adopt each construction described below.

(1) The partially spherical lens is 1.7 or more in refractive index.

(2) The distance between the end surface of the optical fiber and the translucent spherical surface of the partially spherical lens is 0.1 mm or more.

(3) A material of the thin tube is glass or crystallized glass.

(4) The thin tube is a split sleeve.

(5) A material of the split sleeve is a metal.

(6) The adhesive is an epoxy-based resin or a low melting point glass frit mixed with a filler made of at least one material selected from the group consisting of ceramics, glass, and metals.

(7) An inner thin tube having an inner hole with a predetermined inner diameter is inserted into and arranged in the insertion portion of the thin tube, and is bonded and fixed in the insertion portion under a state where an end surface of the inner thin tube that is at right angles to a tube axis of the inner thin tube with predetermined accuracy is abutted against the translucent spherical surface of the partially spherical lens.

Further, a construction may be employed in which the distance between the end surface of the optical fiber and the translucent spherical surface of the partially spherical lens is reduced from an optimum value calculated from the refractive index of the partially spherical lens and a spherical radius of the translucent spherical surface and is set so that a beam waist position falls within the range of a predetermined value ±5 mm within a substantially required working distance.

When the beam waist position of a collimated beam of emission light from the optical collimator falls outside the range of a predetermined value ±5 mm, coupling efficiency is lowered due to light wave characteristics. By adopting the construction described above, it becomes possible to transmit the emitted collimated beam to an optical fiber on a light reception side with high coupling efficiency. As a result, it becomes possible to maintain high-quality communication performance.

Further, in order to attain the object described above, according to the present invention, there is provided a method of assembling an optical collimator including a lens component and a capillary tube into whose inner hole an optical fiber has been fixed, the lens component including: a thin tube; a partially spherical lens that has been fixed in an inner hole of the thin tube so that an insertion portion having a predetermined length is left, is made of glass whose refractive index is approximately uniform, and has translucent spherical surfaces, whose centers of curvature are approximately the same, at both ends of a cylindrical portion of the partially spherical lens; and an adhesive that bonds the partially spherical lens to the thin tube, an axial deviation amount between a center axis of the thin tube and an optical axis of the partially spherical lens being 5 µm or less, an axial deviation amount between an outer peripheral surface of the capillary tube and a core center of an end surface of the optical fiber being 1.5 µm or less, and the capillary tube being inserted into the insertion portion of the thin tube of the lens component and being fixed at a position at which a distance of the end surface of the optical fiber to a focal point position of the partially spherical lens becomes ±40 µm or less, the optical collimator assembling method including: positioning, at the time of the fixation at the position, the capillary tube by measuring a distance between the end surface of the optical fiber and the translucent spherical surface of the partially spherical lens from the outside.

As to each construction element in the optical collimator assembling method described above, every point already described in connection with the optical collimator-use lens component assembling method applies, so that the following description will be simplified by omitting repetitive description.

Also, in the optical collimator assembling method according to the present invention, for the same reason as that already described in connection with the optical collimator-use lens component assembling method, it is possible to adopt each construction described below.

(1) The thin tube has a through portion at a predetermined position with which the distance between the end surface of the optical fiber and the translucent spherical surface of the partially spherical lens can be observed from the outside, and the positioning is performed while the distance between the spherical surface of the partially spherical lens and the end surface of the optical fiber is measured from the outside.

(2) The thin tube is formed using a transparent body with which the distance between the end surface of the optical fiber and the translucent spherical surface of the partially spherical lens can be measured from the outside, and the positioning is performed while the distance between the end surface of the optical fiber and the translucent spherical surface of the partially spherical lens is measured from the outside.

(3) At least one of the thin tube and the inner thin tube is made of transparent glass that transmits 50% or more of light, whose wavelength is 350 to 500 nm, with a thickness of 1 mm.

Further, the distance between the end surface of the optical fiber and the translucent spherical surface of the partially spherical lens may be reduced from an optimum value calculated from the refractive index of the partially spherical lens and a spherical radius of the translucent spherical surface and may be set so that a beam waist position falls within the range of a predetermined value ±5 mm within a substantially required working distance. With this construction, it becomes possible to transmit a collimated beam of emission light with high coupling efficiency. As a result, it becomes possible to maintain high-quality communication performance.

BRIEF DESCRIPTION OF THE DRAWINGS

FIG. 1 are explanatory diagrams of a bend of emission light emitted from an optical collimator, in which

FIG. 4 show optical collimator-use lens components, in which

FIG. 5 show optical collimators, in which

FIG. 7 show a method of using the optical collimator, in which

FIG. 9 show assembling steps of the optical collimator-use lens component and the optical collimator, in which

FIG. 13 show assembling steps of the optical collimator-use lens component and the optical collimator, in which

DETAILED DESCRIPTION OF THE INVENTION

An embodiment of the present invention will now be described with reference to the accompanying drawings.

Figure 1A:
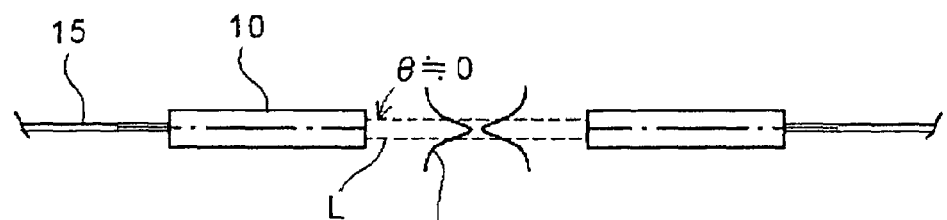
FIG. 1(A) shows an emission light bend in the case where an optical collimator-use lens component according to the present invention is used.
Figure 1B:
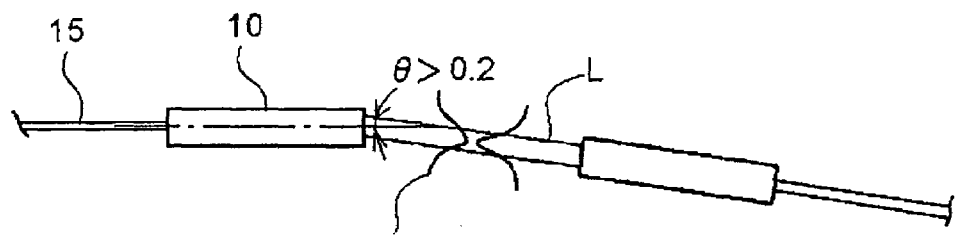
FIG. 1(B) shows an emission light bend in the case where a faulty optical collimator is used.
Figure 2A:
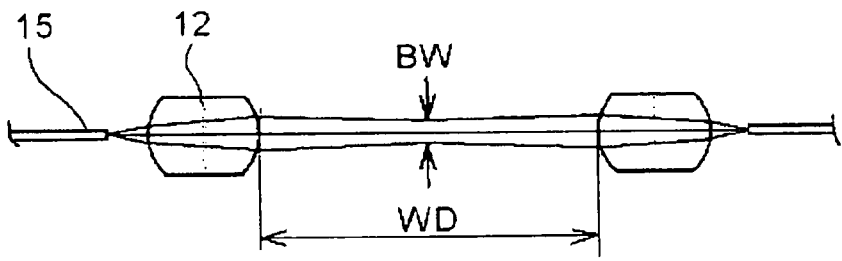
FIG. 2(A) shows a state where optical collimators are arranged so as to oppose each other.
Figure 2B:
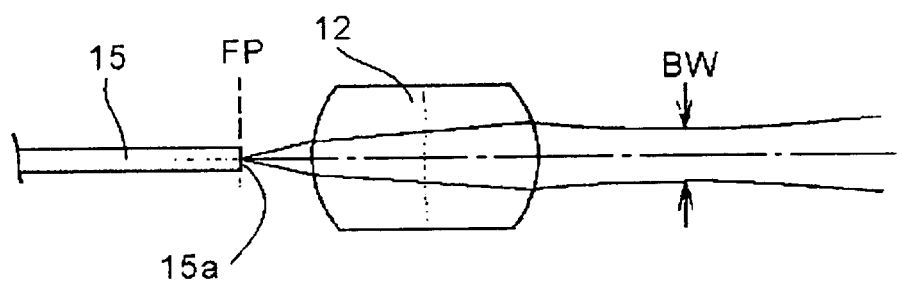
FIG. 2(B) shows a beam waist position in the case where an optical fiber end surface is arranged at a focal point position of a partially spherical lens.
Figure 2C:
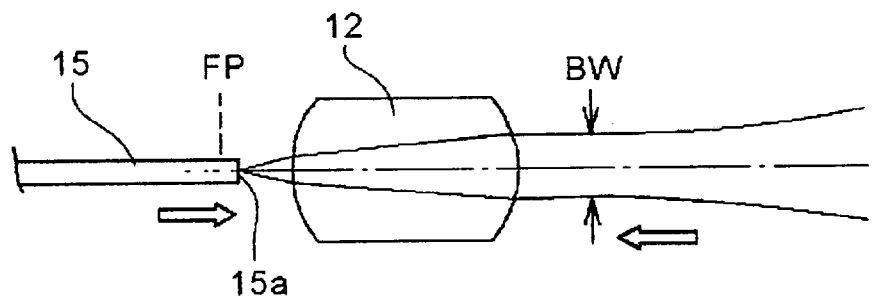
FIG. 2(C) shows a beam waist position in the case where the optical fiber end surface is arranged frontward with respect to the focal point position of the partially spherical lens.
Figure 2D:
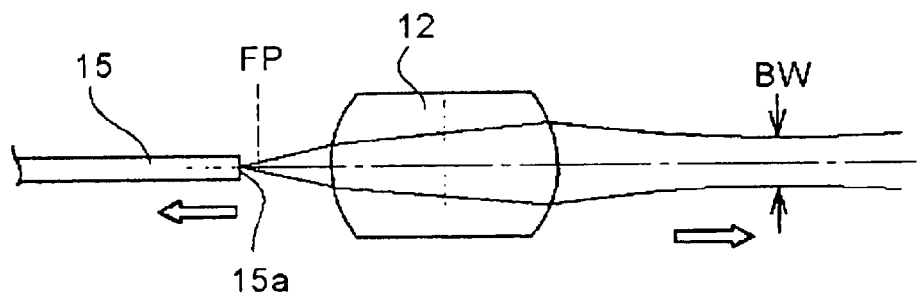
FIG. 2(D) shows a beam waist position in the case where the optical fiber end surface is arranged backward with respect to the focal point position of the partially spherical lens.
Figure 3:
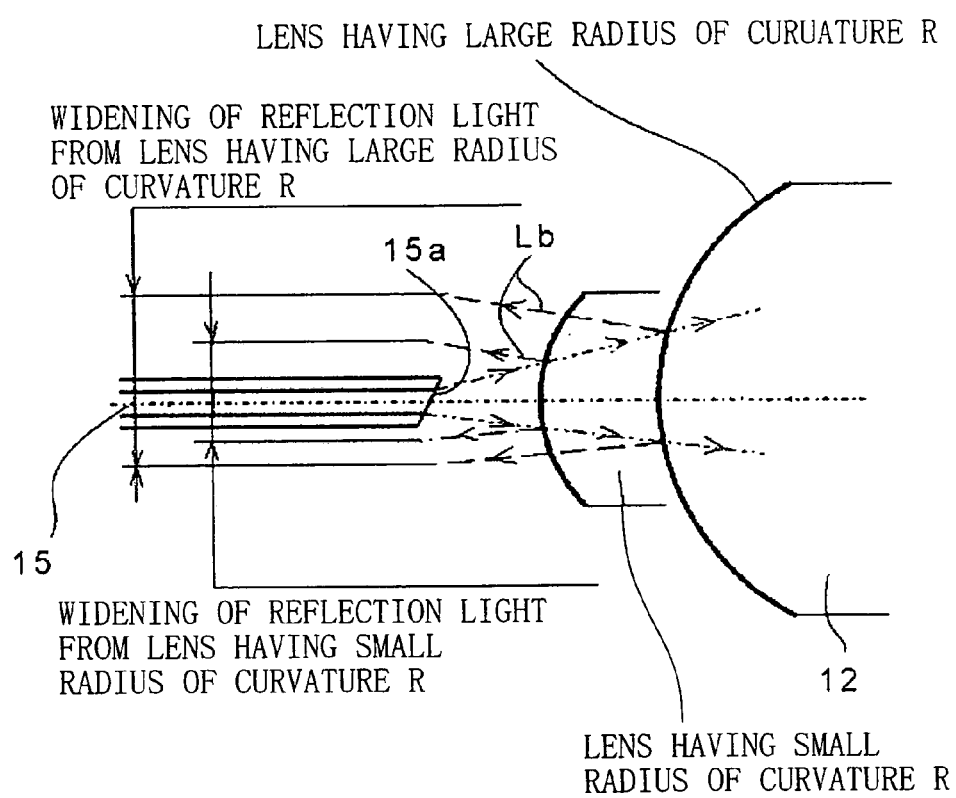
FIG. 3 shows a relation between (i) a distance from a spherical surface and the radius of curvature of the partially spherical lens to the optical fiber end surface and (ii) reflection light.
Figure 4A:
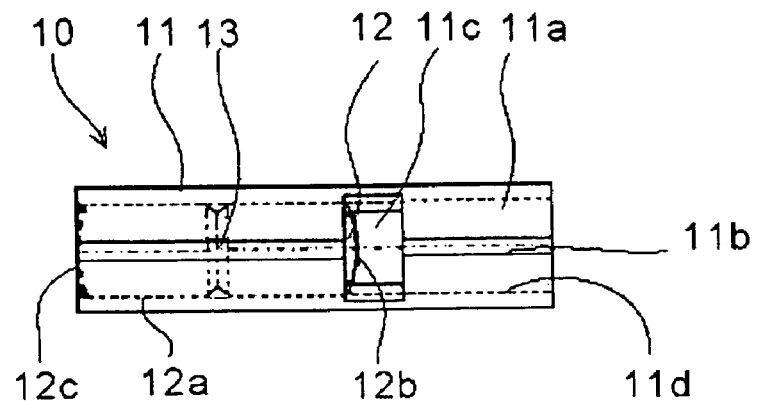
FIG. 4(A) is a plan view and FIG. 4(B) is a cross-sectional view.
Figure 4B:
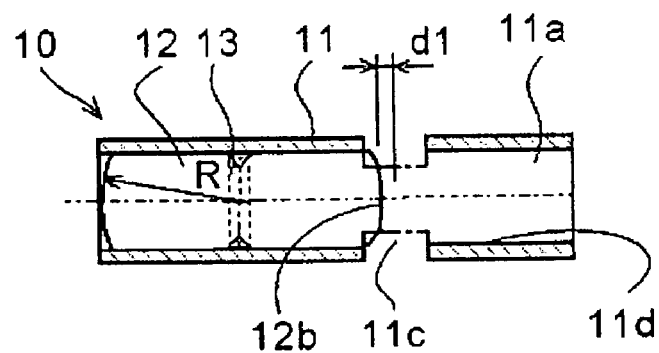

As shown in FIG. 4, an optical collimator-use lens component 10 in this embodiment includes: a phosphor-bronzemade or stainless-made split sleeve 11 that has a linear split portion 11b and a through portion 11c, is 1.60 mm in outer diameter, is 1.249 mm in inner diameter of its inner hole 11d, and is 5.5 mm in total length; a partially spherical lens 12 fixed in the inner hole 11d of the split sleeve 11 so that an insertion portion 11a having a length of 2.5 mm is left; and an adhesive 13 made of an epoxy-based resin for bonding the partially spherical lens 12 to the split sleeve 11. The partially spherical lens 12 is made of optical glass LaSF015, whose refractive index is approximately uniform, and has translucent spherical surfaces 12b and 12c, whose centers of curvature R are approximately the same and radiuses of curvature are each 1.500 ±0.002 mm, at both ends of its cylindrical portion 12a. The axial deviation amount between the center axis of the split sleeve 11 and the optical axis of the partially spherical lens 12 is 3 μm. Also, an antireflection film is formed for each of the translucent spherical surfaces 12b and 12c of the partially spherical lens 12.

Figure 5A:
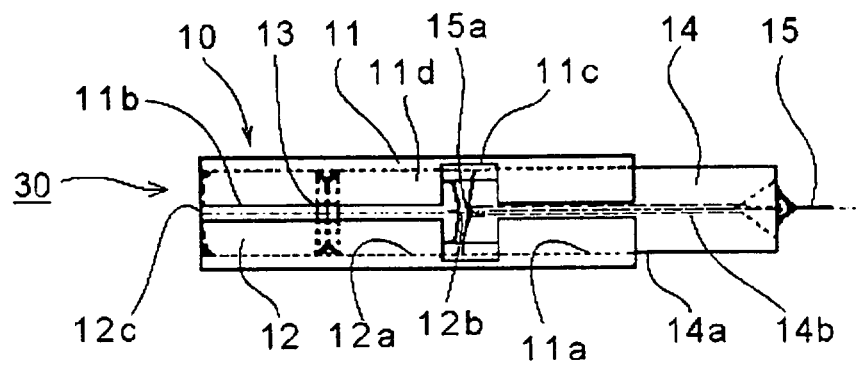
FIG. 5(A) is a plan view and FIG. 5(B) is a cross-sectional view.
Figure 5B:
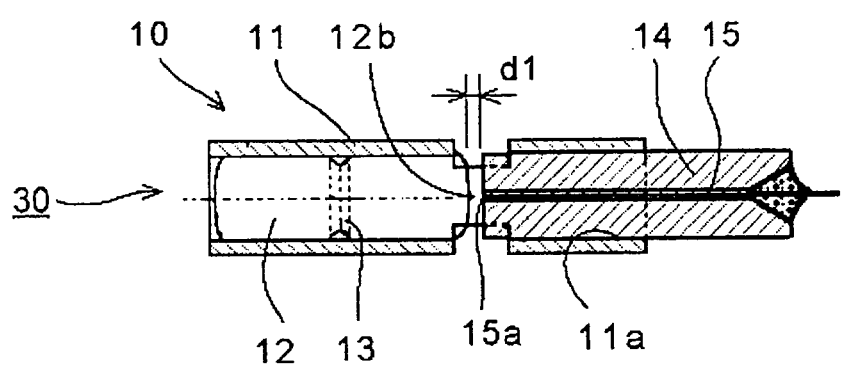

FIG. 5 show an optical collimator 30 in this embodiment that uses the optical collimator-use lens component 10. A capillary tube 14, in whose inner hole 14b a single-mode optical fiber 15 has been fixed, is inserted into and fixed in the insertion portion 11a of the split sleeve 11. The capillary tube 14 is 1.249 mm±0.5 μm in outer diameter and is 5.0 mm in total length. Also, the axial deviation amount between an outer peripheral surface 14a of the capillary tube 14 and the core center of an end surface 15a of the optical fiber 15 is 0.5 μm. The end surface 15a of the optical fiber 15 is inclined by 8° with respect to a plane vertical to the optical axis of the optical fiber 15 and an antireflection film is formed for the end surface 15a. When the capillary tube 14 is fixed at a position at which a distance d1 between the end surface 15a of the optical fiber 15 and the spherical surface 12b of the partially spherical lens 12 becomes 0.215 mm±3 μm, emission light has an emission light bend of 0.1° that is within a desired range of 0.2° or less.

Figure 6:
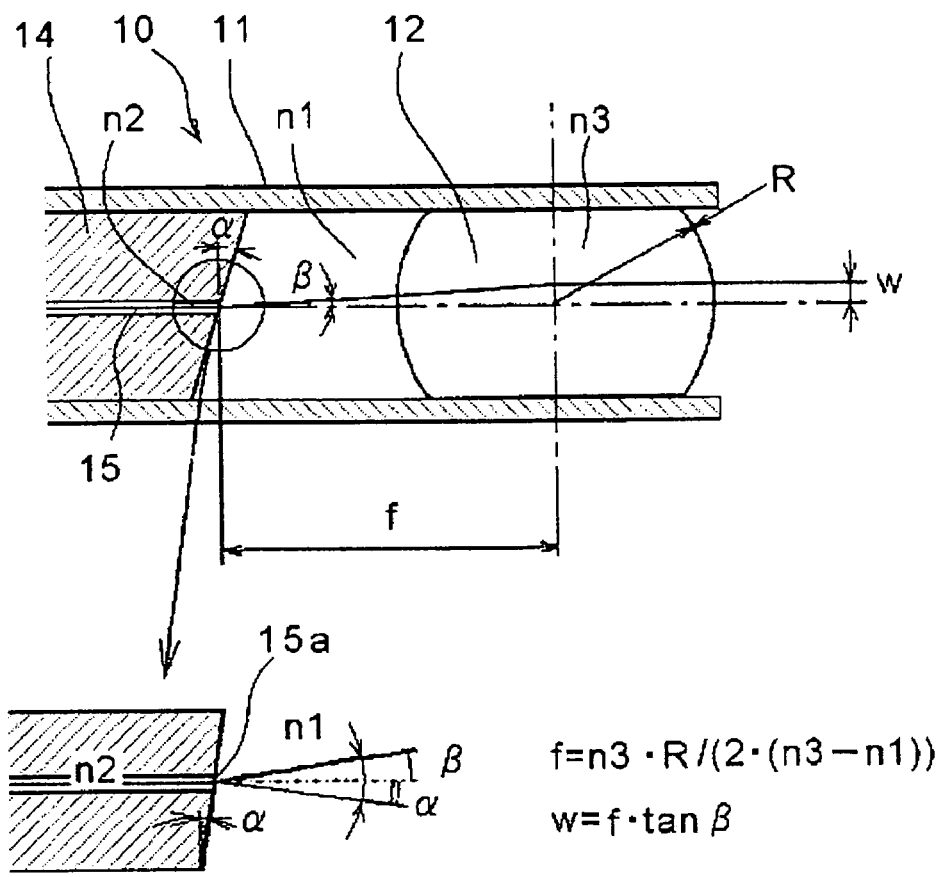
FIG. 6 is a cross-sectional view showing the main portion of the optical collimator.

As shown in FIG. 6, in the optical collimator 30 where the capillary tube 14 has been fixed to the optical collimator-use lens component 10, when an optical signal inclined by β with respect to the optical axis is brought into incident on the partially spherical lens 12 from the end surface 15a of the optical fiber 15 inclined by an inclination angle α with respect to the plane vertical to the optical axis, an offset W occurs between the optical axis of the optical fiber 15 and the optical axis of emission light from the partially spherical lens 12. This offset W has a relation shown in the figure due to the refractive index n3 and the radius of curvature e partially spherical lens 12 and the inclination angle α of the end surface 15a of the optical fiber 15.

Next, four optical collimators 30 were produced and insertion loss and return loss measurement was performed.

Figure 7A:
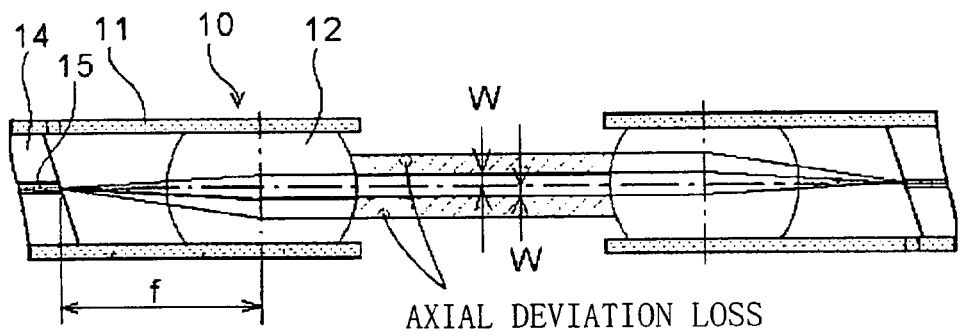
FIG. 7(A) shows a state where offset positions are misaligned.
Figure 7B:
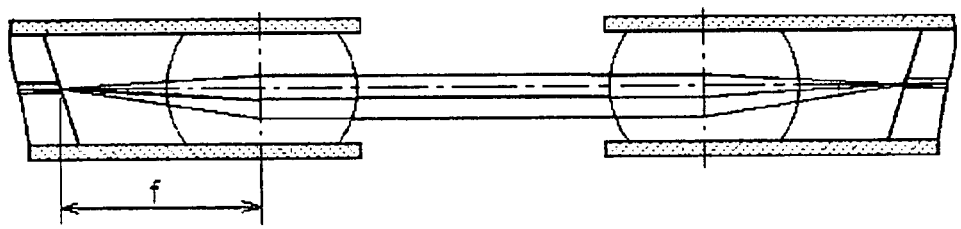
FIG. 7(B) shows a state where the offset positions are aligned.
Figure 7C:
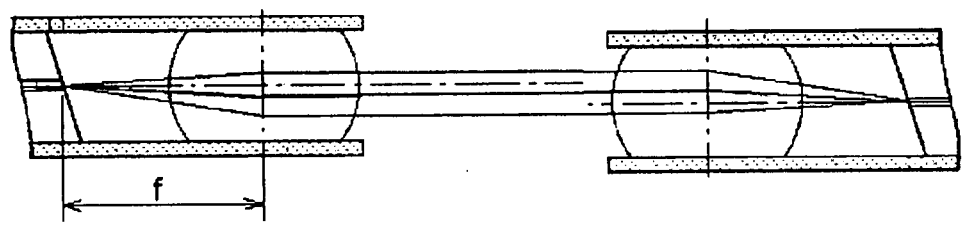
FIG. 7(C) shows a state where a position of emission light is aligned under a state where the offset positions are misaligned.

As shown in FIG. 7, in the optical collimator 30 produced by fixing the capillary tube 14, to which the optical fiber 15 having the inclined end surface 15a has been fastened, to the optical collimator-use lens component 10, an offset W of only 114 μm occurs between the emission light from the partially spherical lens 12 and the optical axis of the optical fiber 15. Therefore, when the directions of offsets W do not coincide with each other, an axial deviation loss of an optical signal shown in FIG. 7(A) occurs. In view of this problem, at the time of the insertion loss and return loss measurement, a working distance was set at 20 mm and the offset positions of one pair of the optical collimator-use lens components 10 arranged so as to oppose each other were aligned as shown in FIG. 7(B) or 7(C). Table 1 below shows a result of the insertion loss measurement.

TABLE 1

| Measurement No. | Minimum value dB | Maximum value dB | Mean value dB |
|---|---|---|---|
| 1 | 0.143 | 0.151 | 0.147 |
| 2 | 0.118 | 0.126 | 0.122 |
| 3 | 0.093 | 0.101 | 0.097 |
| 4 | 0.106 | 0.114 | 0.110 |
| 5 | 0.143 | 0.151 | 0.147 |
| 6 | 0.143 | 0.151 | 0.147 |
| Minimum value dB | | 0.093 | |
| Maximum value dB | | 0.151 | |
| Mean value dB | | 0.128 | |
| Standard deviation dB | | 0.021 | |

Also, the return loss of the optical collimator 30 described above was measured. Table 2 below shows a result of this measurement.

TABLE 2

| | Return loss (dB) | | |
|---|---|---|---|
| Eccentricity | −5 μm | Design distance | +5 μm |
| A 5.0 | 62.32 | 62.44 | 62.60 |
| A 4.0 | 61.52 | 61.99 | 62.54 |
| B 4.5 | 61.88 | 61.99 | 62.22 |
| C 2.5 | 61.91 | 62.05 | 62.30 |
| Mean value | 61.91 | 62.12 | 62.42 |
| | | Return loss | |
| | Unfavorable | <–> | Favorable |

The measurements shown in Table 2 reveal that as a distance between the partially spherical lens and the optical fiber is decreased, the return loss is increased. When the distance described above is 0.215±5 μm, the return loss changes by around ±0.3 dB. Also, a relation between the eccentricity of the partially spherical lens with respect to the sleeve and the return loss was determined to show that when the amount of the eccentricity is 5 μm or less, the return loss changes by around 0.5 dB. Further, measurement as to a relation between the eccentricity of the partially spherical lens with respect to the sleeve and the insertion loss was performed. The dependency of the insertion loss on the eccentricity was confirmed by fixing the optical collimator on a light source side as a reference optical collimator and decentering the lens of the optical collimator on a light reception side by 4 to 5 μm in each of a 0° direction, a 90° direction, a 180° direction, and a 270° direction. Table 3 below shows a result of this measurement.

TABLE 3

Dependency of Insertion Loss on Eccentricity

| | Direction | Insertion loss (dB) |
|---|---|---|
| 1 | 0° | 0.13 |
| 2 | 90° | 0.12 |
| 3 | 180° | 0.13 |
| 4 | 270° | 0.13 |

The measurements shown in Table 3 show that, as to the relation between the eccentricity of the partially spherical lens with respect to the sleeve and the insertion loss, the changing amount of the insertion loss in relation to the direction of the eccentricity is around 0.01 dB.

Also, as to the relation between the direction of the eccentricity and the return loss, measurement was performed using a partially spherical lens having an amount of eccentricity of 4.5 μm. Table 4 below shows a result of this measurement. Note that in Table 4, a case is shown in which a direction (1) of eccentricity is set as a direction in which the tip end of the optical fiber gets closer to the optical axis of the partially spherical lens, and a direction (2) of eccentricity is set as a direction in which the tip end of the optical fiber gets away from the optical axis of the partially spherical lens.

TABLE 4

| Measurement No. | Return loss (dB) | |
|---|---|---|
| | Direction (1) of eccentricity | Direction (2) of eccentricity |
| 1 | 62.43 | 61.54 |
| 2 | 62.50 | 61.57 |
| 3 | 62.12 | 61.90 |
| 4 | 61.45 | 60.75 |
| 5 | 63.68 | 61.98 |
| Mean value | 62.44 | 61.55 |
| | Favorable <-> Unfavorable | |

The measurements shown in Table 4 reveal that the direction (1) of eccentricity is better than the direction (2) of eccentricity. As described above, when the amount of the eccentricity is managed so as to become 5 μm or less, the changing amount of the return loss becomes around 0.5 dB.

Next, a method of assembling the optical collimator-use lens component 10 and a method of assembling the optical collimator 30 will be described.

Figure 8A:
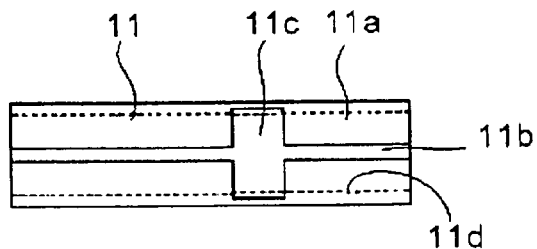
FIGS. 8(A) and (B) show a split sleeve.
Figure 8B:
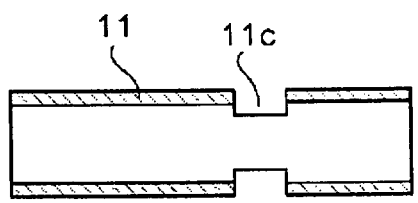
FIG. 8(C) shows an inner thin tube.
FIG. 8(D) shows a partially spherical lens.
FIG. 8(E) shows a capillary tube with an optical fiber.

First, as shown in FIGS. 8(A) and (B), the split sleeve 11 is produced by establishing the through portion 11c in a split sleeve that has a linear split portion, is 1.60 mm in outer diameter, is 1.249 mm in inner diameter of its inner hole, and is 5.5 mm in total length. When doing so, working is performed while attention is paid so that the accuracy of the split sleeve 11 is not lowered.

Figure 8C:

Next, as shown in FIG. 8(C), an inner thin tube 17 is produced which is 1.249 mm in outer diameter, is 0.68 mm in inner diameter of its inner hole 17b, and has an end surface 17a that is at right angles to its tube axis with accuracy of ±0.1° or less.

Figure 8D:
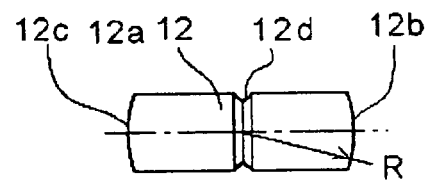

Then, as shown in FIG. 8(D), a sphere lens, whose radius of curvature R is 1.500±0.002 mm, is produced using optical glass LaSF015 whose refractive index is approximately uniform. Next, the cylindrical portion 12a is formed by grinding this sphere lens while rotating the lens about its optical axis. Following this, a ring-like groove 12d is formed into which the adhesive is to be charged. In this manner, the partially spherical lens 12 having the translucent spherical surfaces 12b and 12c on its both ends is obtained.

Figure 8E:
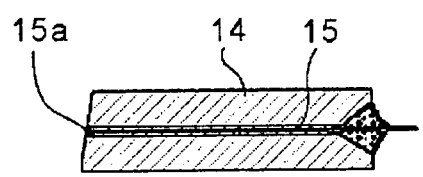

Next, as shown in FIG. 8(E), the capillary tube 14 is produced which is 1.249 mm±0.5 μm in outer diameter and is 5.0 mm in total length, and the optical fiber 15 is fixed in the inner hole 14b. The end surface 15a of the optical fiber 15 is inclined by 8° with respect to a plane vertical to the optical axis of the optical fiber 15 and an antireflection film is formed for the end surface 15a. The axial deviation amount between the outer peripheral surface 14a of the capillary tube 14 and the core center of the end surface 15a of the optical fiber 15 is 0.5 μm.

Figure 9A:
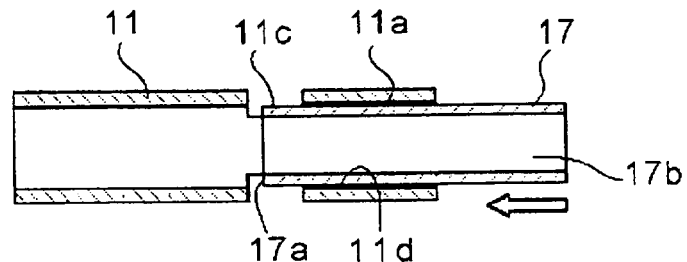
FIG. 9(A) shows a step in which the inner thin tube is fitted into the split sleeve.
Figure 9B:
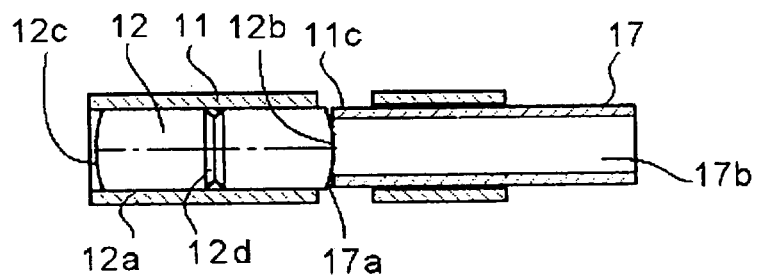
FIG. 9(B) shows a step in which the partially spherical lens is fitted into the split sleeve.
Figure 9C:
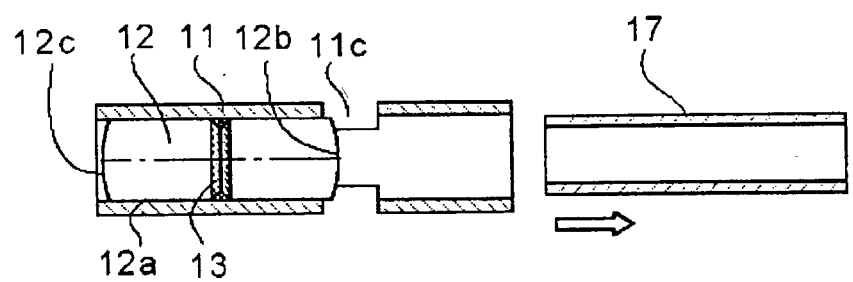
FIG. 9(C) shows a step in which the inner thin tube is removed from the split sleeve.

Next, as shown in FIG. 9(A), the inner thin tube 17 is inserted into the inner hole 11d of the split sleeve 11 and is fixed at a position at which a distance between its right-angled end surface 17a and the end surface of the split sleeve 11 becomes 2.5 mm. Then, as shown in FIG. 9(B), the partially spherical lens 12 is inserted into the inner hole 11d of the split sleeve 11 and the translucent spherical surface 12b is abutted against the end surface 17a of the inner thin tube 17, thereby positioning the partially spherical lens 12. Following this, as shown in FIG. 9(C), the partially spherical lens 12 is fastened to the inner hole 11d of the split sleeve 11 using the adhesive 13. After the adhesive 13 is completely cured, the inner thin tube 17 is removed to provide the optical collimator-use lens component 10.

Figure 9D:
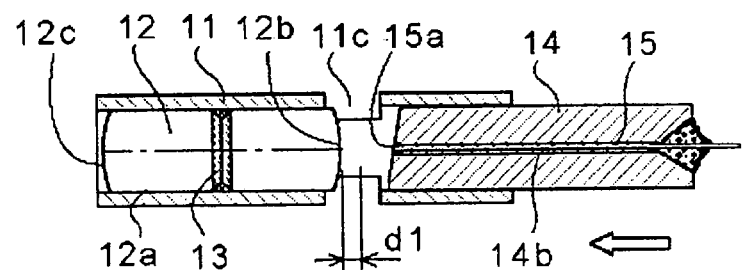
FIG. 9(D) shows a step in which the capillary tube with the optical fiber is fitted into the split sleeve.

Then, as shown in FIG. 9(D), the capillary tube 14, in whose inner hole 14b the optical fiber 15 has been fixed, is inserted into the insertion portion 11a of the split sleeve 11. Then, while observation/measurement through the through portion 11c are performed, the capillary tube 14 is positioned, fixed, and bonded at a position at which the distance d1 between the end surface 15a of the optical fiber 15 and the translucent spherical surface 12b of the partially spherical lens 12 becomes 0.215 mm±2 μm. In this manner, the optical collimator 30 is obtained.

Next, another embodiment of the present invention will be described.

Figure 10:
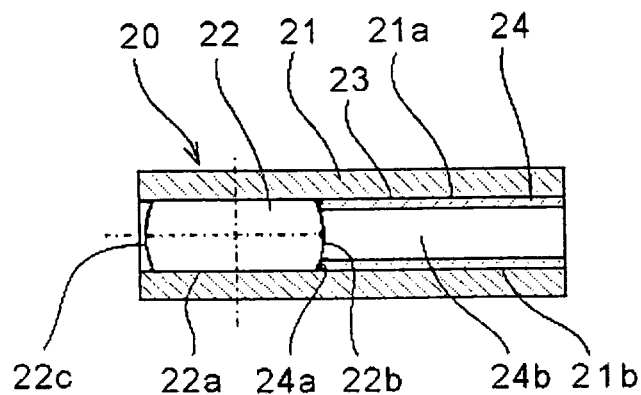
FIG. 10 is a cross-sectional view of an optical collimator-use lens component according to another embodiment.

As shown in FIG. 10, an optical collimator-use lens component 20 includes: a glass thin tube 21 that is 1.80 mm in outer diameter, is ϕ1.005 mm+0.01/−0 mm in inner diameter of its inner hole 21b, and is 6.0 mm in total length; a partially spherical lens 22 fixed in the inner hole 21b of the glass thin tube 21 so that an insertion portion 21a having a predetermined length is left; a glass inner thin tube 24 inserted into and fastened in the insertion portion 21a of the glass thin tube 21; and an adhesive 23 made of an epoxy-based ultraviolet curing resin that bonds the partially spherical lens 22 and the glass inner thin tube 24 to the glass thin tube 21. The partially spherical lens 22 is made of optical glass LaSF015 whose refractive index is approximately uniform, is ϕ0.98 mm in diameter, and has translucent spherical surfaces 22b and 22c, whose centers of curvature are approximately the same and radiuses of curvature R are each 1.25±0.0015 mm, at both ends of its cylindrical portion 22a. Also, eccentricity between the center axis of the outer peripheral surface of the partially spherical lens 22 and the center axes of the spherical surfaces is 5 μm or less. The glass inner thin tube 24 is 0.997 mm±0.005 mm in outer diameter, is 0.68 mm+0.002/−0 mm in inner diameter of its inner hole 24b, and is 3.45 mm in length. The glass inner thin tube 24 is inserted into and fastened to the insertion portion 21a of the glass thin tube 21 under a state where an end surface 24a of the glass inner thin tube 24 that is at right angles to a tube axis of the glass inner thin tube 24 is abutted against the translucent spherical surface 22b of the partially spherical lens 22. The axial deviation amount among the center axis of the inner hole 21b of the glass thin tube 21, the optical axis of the partially spherical lens 22, and the center axis of the inner hole 24b of the glass inner thin tube 24 is 3 μm. Also, the glass thin tube 21 and the glass inner thin tube 24 are each made of transparent borosilicate glass that transmits 85% of light, whose wavelength is 350 to 500 nm, with a thickness of 1 mm.

Figure 11:
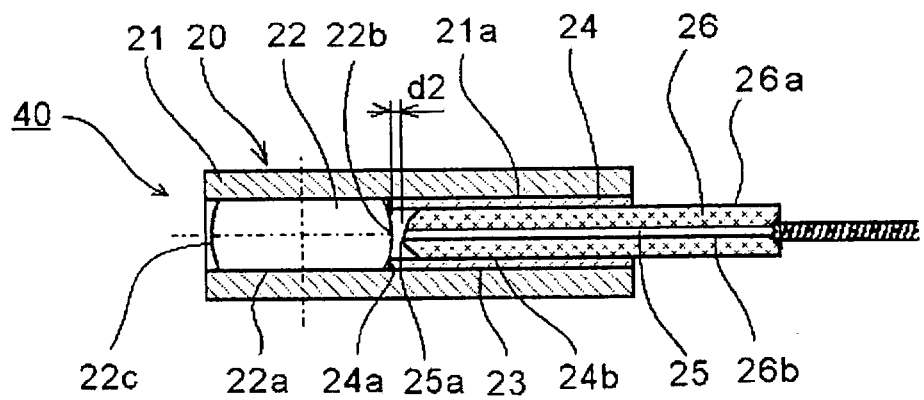
FIG. 11 is a cross-sectional view of an optical collimator according to the other embodiment.

FIG. 11 shows an optical collimator 40 that uses the optical collimator-use lens component 20. A capillary tube 26, in whose inner hole 26b an optical fiber 25 has been fixed, is inserted into and fixed in the inner hole 24b of the glass inner thin tube 24 fixed in the insertion portion 21a of the glass thin tube 21. The capillary tube 26 is 0.68 mm+0/−0.002 mm in outer diameter and is 5.25 mm in total length. Also, the axial deviation amount between an outer peripheral surface 26a of the capillary tube 26 and the core center of an end surface 25a of the optical fiber 25 is 0.5 μm. When the capillary tube 26 is fixed at a position at which a distance d2 between the end surface 25a of the optical fiber 25 and the spherical surface 22b of the partially spherical lens 22 becomes 0.182 mm±2 μm, emission light has an emission light bend of 0.1 that is within a desired range of 0.2° or less.

When the capillary tube 26, to which the optical fiber 25 having the inclined end surface 25a has been fastened, is fixed to the optical collimator-use lens component 20, emission light generates an offset W from the optical axis of the optical fiber 25 only by 95 μm like in the case shown in FIG. 7. In view of this, insertion loss and return loss measurement was performed by aligning offset positions of one pair of optical collimator-use lens components 20 arranged so as to oppose each other while setting a working distance at 20 mm in the manner shown in FIG. 7(B) or (C).

This measurement showed that the optical collimator 40 using the optical collimator-use lens component 20 has superior characteristics that do not greatly differ from those of the aforementioned optical collimator 30 using the optical collimator-use lens component 10.

Next, a method of assembling the optical collimator-use lens component 20 and a method of assembling the optical collimator 40 will be described.

Figure 12A:
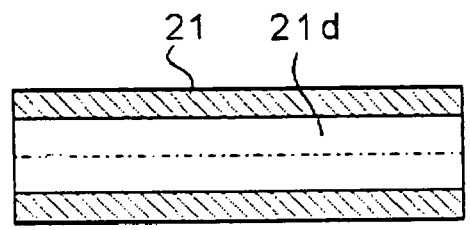
FIG. 12 (A) shows a glass thin tube, FIG. 12 (B) shows a glass inner thin tube, FIG. 12 (C) shows a partially spherical lens, and FIG. 12 (D) shows a capillary.
Figure 12B:
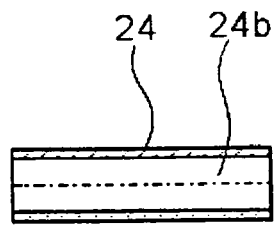
Figure 12C:
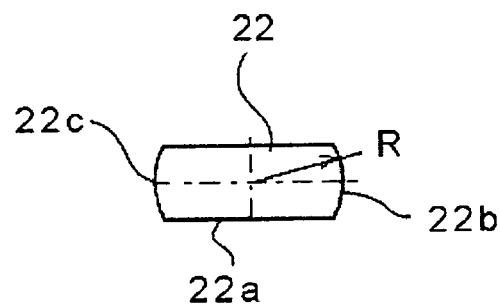
Figure 12D:
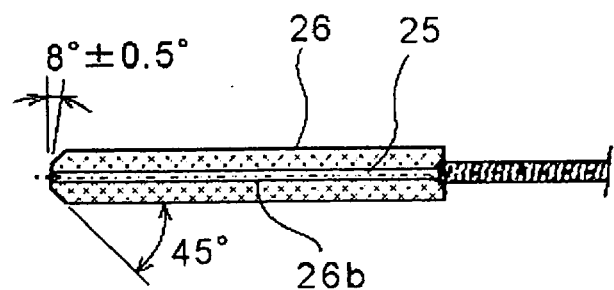

First, as shown in FIG. 12(A), the glass thin tube 21 is prepared which is 1.005 mm in inner diameter of its inner hole 21d and is 6.0 mm in total length. Also, as shown in FIG. 12(B), the glass inner thin tube 24 is prepared which is 0.997 mm±0.005 mm in outer diameter, is 0.68 mm+0.002/−0 mm in inner diameter of its inner hole 24b, and is 3.45 mm in length. Further, as shown in FIG. 12(C), the partially spherical lens 22 is prepared which is made of optical glass LaSF015 whose refractive index is approximately uniform, is ϕ0.98 mm in diameter, has the translucent spherical surfaces 22b and 22c whose centers of curvature are approximately the same and radiuses of curvature R are each 1.250±0.0015 mm, at both ends of the cylindrical portion 22a, and is 5 μm or less in eccentricity between the center axis of its outer peripheral surface and the center axes of its spherical surfaces. Still further, as shown in FIG. 12(D), the capillary tube 26 is prepared which is 0.68 mm+0/−0.002 mm in outer diameter and is 5.25 mm in total length, and the optical fiber 25 is fixed in the inner hole 26b.

Figure 13A:
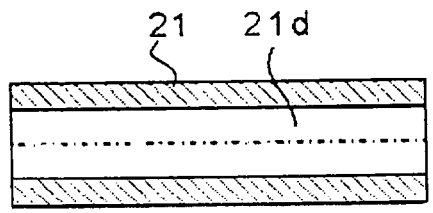
FIG. 13(A) shows the glass thin tube.
Figure 13B:
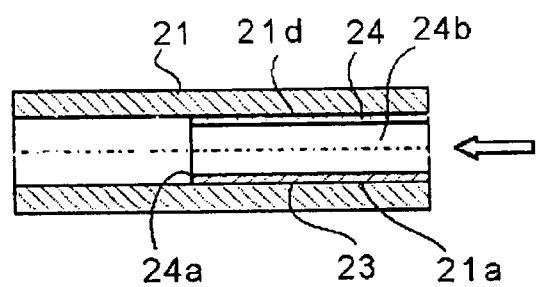
FIG. 13(B) shows a step in which the glass inner thin tube is fitted into the glass thin tube.
Figure 13C:
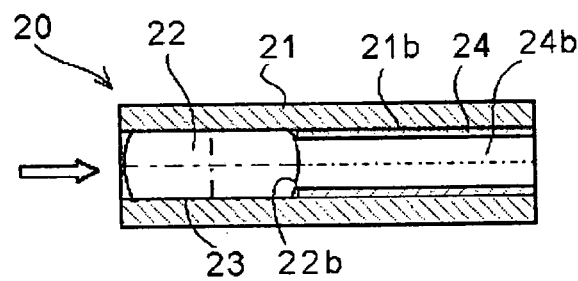
FIG. 13(C) shows a step in which the partially spherical lens is fitted into the glass thin tube.

Next, as shown in FIG. 13(B), the glass inner thin tube 24 is inserted into the inner hole 21d of the glass thin tube 21 {FIG. 13(A)}, its right-angled end surface 24a is positioned at a position at which the length of the insertion portion 21a becomes 2.5 mm, and the glass inner thin tube 24 is fastened using the adhesive 23 made of an epoxy-based ultraviolet curing resin. Then, as shown in FIG. 13(C), the partially spherical lens 22 is inserted into the inner hole 21d of the glass thin tube 21 and its translucent spherical surface 22b is abutted against the end surface 24a of the glass inner thin tube 24 and is positioned. Following this, the partially spherical lens 12 is fastened to the inner hole 21d of the glass thin tube 21 using the adhesive 23. In this manner, the optical collimator-use lens component 20 is obtained.

Figure 13D:
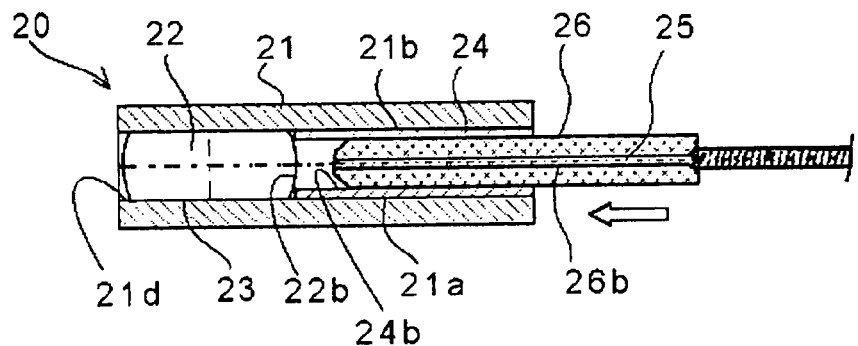
FIG. 13(D) shows a step in which a capillary tube with an optical fiber is fitted into the glass inner thin tube.
Figure 14:
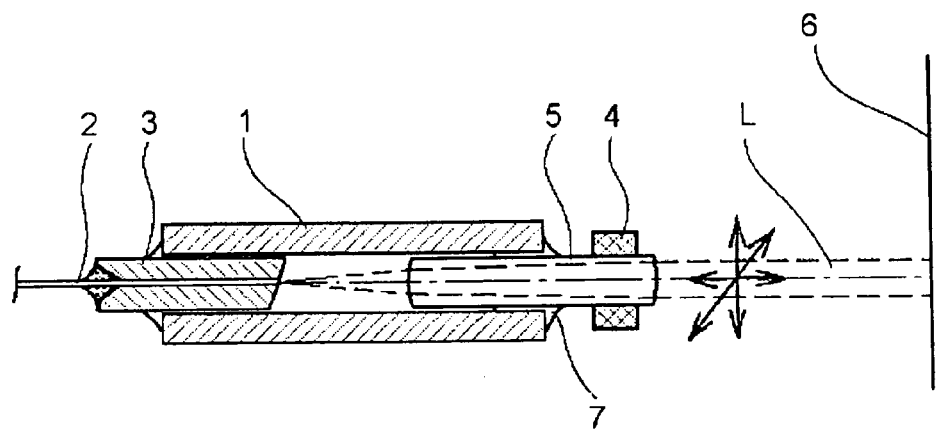
FIG. 14 is an explanatory diagram of a conventional optical collimator assembling method.

Then, as shown in FIG. 13(D), the capillary tube 26, in whose inner hole 26b the optical fiber 25 has been fixed, is inserted into the inner hole 24b of the glass inner thin tube 24 fixed in the insertion portion 21a of the glass thin tube 21. Then, the capillary tube 26 is positioned and bonded at a position at which the distance d between the end surface 25a of the optical fiber 25 and the spherical surface 22b of the partially spherical lens 22 becomes 0.182 mm±2 μm. In this manner, the optical collimator 40 is obtained.

It should be noted here that in the embodiment described above, the split sleeve is set as a transparent glass tube, although the present invention is not limited to this. For instance, the split sleeve may be a plastic tube, a metallic tube having a hole through which it is possible to observe the distance between the end surface of the optical fiber and the spherical surface of the partially spherical lens, or the like.

The insertion loss of the optical collimator described above was measured in a manner described below. That is, two optical collimators were produced and prepared, an optical fiber was connected to a laser diode stabilized light source whose wavelength is 1,550 nm, and one of the optical collimators was connected to this optical fiber by means of a fusion splice. Then, this optical collimator was fixed to a five-axis optical stage having two rotational axes orthogonal to XYZ spatial axes. Next, the other of the optical collimators was fixed to an optical base and a tip end of an optical fiber that is a pigtail of the optical collimator was connected to a power meter. Following this, an imaging relation between the two optical collimators was obtained through alignment using the five-axis stage, and a light reception quantity was measured using the power meter under this state. Then, a light reception quantity measurement value obtained in advance by directly connecting the stabilized light source and the power meter to each other through an optical fiber was subtracted from the light reception quantity measured in the manner described above, thereby calculating the insertion loss. Also, the return loss of the optical collimator described above was measured in a manner described below. That is, an optical fiber having a sufficient length (10 mm or more) was connected to an OTDR (optical time domain reflect meter). Then, the optical collimator was fixed to a tip end of the optical fiber by means of a fusion splice and the intensity of reflection light was measured, thereby measuring the return loss.

The invention claimed is:

1. An optical collimator-use lens component comprising:
a thin tube wherein the thin tube is made of a transparent body with which the distance between the end surface of an optical fiber and the translucent spherical surface of a partially spherical lens can be measured from the outside;
the partially spherical lens that is fixed in an inner hole of the thin tube so that an insertion portion having a predetermined length is left, is made of glass whose refractive index is approximately uniform, and has translucent spherical surfaces, whose centers of curvature are approximately the same, at both ends of a cylindrical portion of the partially spherical lens; and
an adhesive that bonds the partially spherical lens to the thin tube,
wherein an axial deviation amount between a center axis of the thin tube and an optical axis of the partially spherical lens is 5 μm or less, and
when a capillary tube, in whose inner hole an optical fiber has been fixed and whose axial deviation amount between an outer peripheral surface of the capillary tube and a core center of an end surface of the optical fiber is 1.5 μm or less, is inserted into the insertion portion of the thin tube and the end surface of the optical fiber is fixed at a position at which a distance of the end surface to a focal point position of the partially spherical lens becomes ±40 μm or less, emission light has an emission light bend of 0.2° or less with respect to the center axis of the thin tube.

2. An optical collimator-use lens component according to claim 1, wherein the partially spherical lens is 1.7 or more in refractive index.

3. An optical collimator-use lens component according to claim 1, wherein the distance between the end surface of the optical fiber and the translucent spherical surface of the partially spherical lens is 0.1 mm or more.

4. An optical collimator-use lens component according to claim 1, wherein a material of the thin tube comprises one of glass and crystallized glass.

5. An optical collimator-use lens component according to claim 1, wherein the thin tube comprises a split sleeve.

6. An optical collimator-use lens component according to claim 1, wherein the adhesive comprises one of an epoxy-based resin and a low melting point glass frit mixed with a filler made of at least one material selected from the group consisting of ceramics, glass, and metals.

7. The optical collimator-use lens component according to claim 1, wherein an inner thin tube having an inner hole with a predetermined inner diameter is inserted into and arranged in the insertion portion of the thin tube, and is bonded and fixed in the insertion portion under a state where an end surface of the inner thin tube that is at right angles to a tube axis of the inner thin tube with predetermined accuracy is abutted against the translucent spherical surface of the partially spherical lens.

8. An optical collimator-use lens component according to claim 7, wherein at least one of the thin tube and the inner thin tube is made of transparent glass that transmits 50% or more of light, whose wavelength is 350 to 500 nm, with a thickness of 1 mm.

9. A method of assembling an optical collimator-use lens component including a thin tube, a partially spherical lens that has been fixed in an inner hole of the thin tube so that an insertion portion having a predetermined length is left, is made of glass whose refractive index is approximately uniform, and has translucent spherical surfaces, whose centers of curvature are approximately the same, at both ends of a cylindrical portion of the partially spherical lens, and an adhesive that bonds the partially spherical lens to the thin tube, the optical collimator-use lens component assembling method comprising:

inserting an inner thin tube having an inner hole with a predetermined inner diameter into the inner hole of the thin tube and fixing the inner thin tube under a state where an end surface of the inner thin tube that is at right angles to a tube axis of the inner thin tube with predetermined accuracy exists at a predetermined position;

positioning the partially spherical lens by inserting the partially spherical lens into the inner hole of the thin tube so as to be abutted against the end surface of the inner thin tube; and bonding and fixing the partially spherical lens in the thin tube.

10. An optical collimator-use lens component assembling method according to claim 9, further comprising removing the inner thin tube from the inside of the thin tube one of before and after the partially spherical lens is bonded and fixed in the thin tube.

11. An optical collimator comprising a lens component and a capillary tube into whose inner hole an optical fiber has been fixed, wherein:

the lens component includes:

a thin tube wherein the thin tube is made of a transparent body with which the distance between the end surface of the optical fiber and the translucent spherical surface of a partially spherical lens can be measured from the outside;

the partially spherical lens that is fixed in an inner hole of the thin tube so that an insertion portion having a predetermined length is left, is made of glass whose refractive index is approximately uniform, and has translucent spherical surfaces, whose centers of curvature are approximately the same, at both ends of a cylindrical portion of the partially spherical lens; and an adhesive that bonds the partially spherical lens to the thin tube, an axial deviation amount between a center axis of the thin tube and an optical axis of the partially spherical lens being 5 μm or less;

an axial deviation amount between an outer peripheral surface of the capillary tube and a core center of an end surface of the optical fiber is 1.5 μm or less; and the capillary tube is inserted into the insertion portion of the thin tube of the lens component and is fixed at a position at which a distance of the end surface of the optical fiber to a focal point position of the partially spherical lens becomes ±40 μm or less.

12. An optical collimator according to claim 11, wherein the partially spherical lens is 1.7 or more in refractive index.

13. An optical collimator according to claim 11, wherein the distance between the end surface of the optical fiber and the translucent spherical surface of the partially spherical lens is 0.1 mm or more.

14. An optical collimator according to claim 11, wherein a material of the thin tube comprises one of glass and crystallized glass.

15. An optical collimator according to claim 11, wherein the thin tube comprises a split sleeve.

16. An optical collimator according to claim 11, wherein the adhesive comprises one of an epoxy-based resin and a low melting point glass frit mixed with a filler made of at least one material selected from the group consisting of ceramics, glass, and metals.

17. The optical collimator according to claim 11, wherein an inner thin tube having an inner hole with a predetermined inner diameter is inserted into and arranged in the insertion portion of the thin tube, and is bonded and fixed in the insertion portion under a state where an end surface of the inner thin tube that is at right angles to a tube axis of the inner thin tube with predetermined accuracy is abutted against the translucent spherical surface of the partially spherical lens.

18. A method of assembling an optical collimator including a lens component and a capillary tube into whose inner hole an optical fiber has been fixed, the lens component including:

a thin tube wherein the thin tube is formed using a transparent body with which the distance between the end surface of the optical fiber and the translucent spherical surface of the partially spherical lens can be measured from the outside, and the positioning is performed while the distance between the end surface of the optical fiber and the translucent spherical surface of the partially spherical lens is measured from the outside;

the partially spherical lens that is fixed in an inner hole of the thin tube so that an insertion portion having a predetermined length is left, is made of glass whose refractive index is approximately uniform, and has translucent spherical surfaces, whose centers of curvature are approximately the same, at both ends of a cylindrical portion of the partially spherical lens; and an adhesive that bonds the partially spherical lens to the thin tube, an axial deviation amount between a center axis of the thin tube and an optical axis of the partially spherical lens being 5 µm or less, an axial deviation amount between an outer peripheral surface of the capillary tube and a core center of an end surface of the optical fiber being 1.5 µm or less, and the capillary tube being inserted into the insertion portion of the thin tube of the lens component and being fixed at a position at which a distance of the end surface of the optical fiber to a focal point position of the partially spherical lens becomes ±40 µm or less, the optical collimator assembling method comprising:

positioning, at the time of the fixation at the position, the capillary tube by measuring a distance between the end surface of the optical fiber and the translucent spherical surface of the partially spherical lens from the outside.

19. An optical collimator assembling method according to claim 18, wherein at least one of the thin tube and an inner thin tube is made of transparent glass that transmits 50% or more of light, whose wavelength is 350 to 500 nm, with a thickness of 1 mm.

* * * * *